(No Model.)

M. BREMER.
FASTENER FOR COFFINS.

No. 388,624. Patented Aug. 28, 1888.

WITNESSES:
E. J. Griswold.
Geo. A. Crane.

INVENTOR,
Max Bremer.
BY
Howson and Howson,
his ATTORNEYS.

UNITED STATES PATENT OFFICE.

MAX BREMER, OF NEW YORK, N. Y.

FASTENER FOR COFFINS.

SPECIFICATION forming part of Letters Patent No. 388,624, dated August 28, 1888.

Application filed February 23, 1888. Serial No. 264,908. (No model.)

*To all whom it may concern:*

Be it known that I, MAX BREMER, a citizen of the United States, and a resident of New York city, New York, have invented certain Improvements in Fastenings for Burial-Cases, of which the following is a specification.

My invention consists of certain improvements in the fastening devices of burial-cases, designed with the view mainly of facilitating and simplifying the opening and closing of the case.

Figure 1:
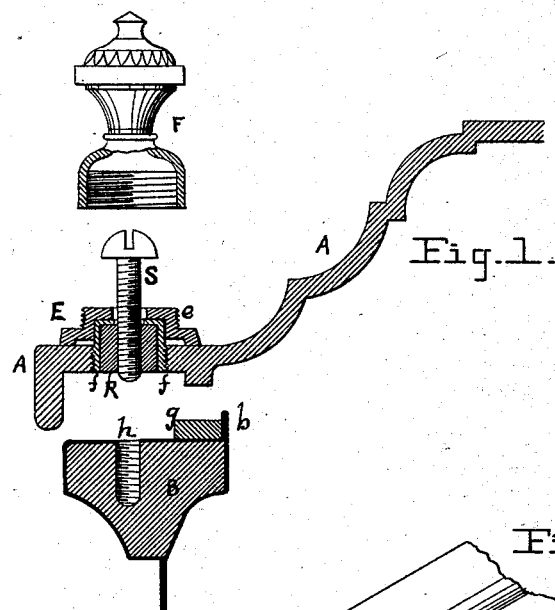
Figure 2:
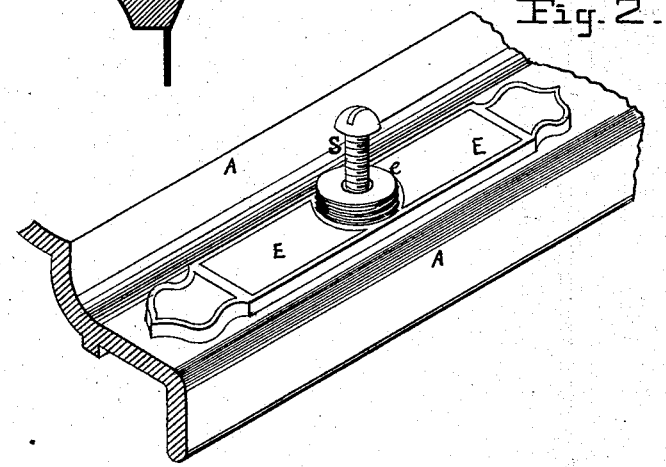
Figure 3:
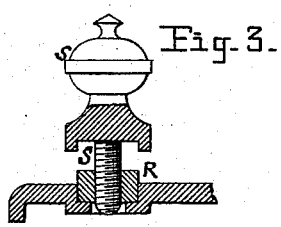

In the accompanying drawings, Figure 1 is a vertical section of a part of the body and lid of a burial-case with one of the fastening devices. Fig. 2 is a perspective view of a portion of the lid with the retaining-screw and escutcheon, and Fig. 3 is a view of a modification.

My improvements are intended for metallic burial-cases, but some of the improvements may be used in connection with other styles of coffins.

In the drawings, A represents the metallic lid of the burial-case, and B the rim of the body, which in this instance is represented as of metal with the sheet metal wrapped around it, the sheet metal being continued below the bar to form the walls of the coffin. On the surface of the rim of the body is a rubber gasket, $g$, and inside it a flange, $b$, which may be formed out of the sheet metal wrapped around the bar. The rim B of the body is tapped at suitable intervals with screw-holes $h$ for the reception of the retaining-screws S, which pass through the rims of the lid. In the burial-cases as heretofore constructed these retaining-screws have passed freely through the openings in the rim of the lid, so that when the lid was lifted off it was necessary to entirely remove all the retaining screws and lay them on one side, and when the lid was replaced it was of course necessary to collect the screws and insert them in place again preparatory to screwing them down. Not only was this necessary in all instances, but also in most cases escutcheons E, varying in design, were used around the retaining-screws, these escutcheons being provided with threaded bosses $e$, on which were fitted inclosing-caps F, or "urns," as they are termed; hence, it was necessary to remove not only all the screws, as well as the caps, but the escutcheons also had to be taken off and laid on one side whenever the lid was taken off. Whenever the lid was replaced, it was necessary to replace the three pieces for every one of the dozen or more fastenings in the coffin. To avoid all this as far as possible, and to simplify and facilitate the removal of the casing and fastenings of the lid, I provide the lid with retainers which will hold the escutcheons in place, and also the several fastening-screws on the lid when the latter is removed from the body of the coffin. I provide the lid with a hollow boss, $f$, for each screw and escutcheon, and in this hollow boss I may secure, by cement or otherwise, a piece of rubber, R. In Fig. 1 I have shown this hollow boss as secured to the lid by being screwed into a threaded opening in the rim of the lid. A socket for the upper part of this boss is formed in the escutcheon E, as shown in Fig. 1. The hollow boss may, however, be secured to the lid in other ways, as by flanging, or in some cases may be entirely dispensed with. For instance, in the modification shown in Fig. 3 the frictional retainer R is a piece of rubber cemented in a recess or socket in the lid or cap and the retaining-screw, instead of being an ordinary set-screw, is shown as provided with a knob or thumb-piece, $s$, by which it may be manipulated. This construction is more particularly applicable to the securing of the cap to the lid rather than to the securing of the lid itself to the body of the case. The rubber retainer will yield sufficiently to permit the screw to take into the threaded opening and make a tight joint under all circumstances.

I do not wish to confine myself to the rubber retainer, as other retaining devices may be used, so long as they will yield sufficiently to permit the screws, when the lid is put on the case, to properly take into the threads of the holes $h$ and make a tight joint, and on the other hand retain the screws when the latter are withdrawn from the rim of the body.

I claim as my invention—

1. The combination of the body and metallic lid of a burial-case and securing-screws therefor with yielding retainers for the screws carried by the lid.

2. The combination of the body and lid of a burial-case and securing-screws for the lid with hollow bosses carried by the lid and containing yielding material through which the retaining-screws pass.

3. The combination of the body and lid of a burial-case and retaining-screws therefor with hollow bosses on the lid, socketed escutcheons to fit on the said bosses, and screws passing through the escutcheons and bosses.

In testimony whereof I have signed my name to this specification in the presence of two subscribing witnesses.

MAX BREMER.

Witnesses:
GEORGE A. CRANE,
HUBERT HOWSON.